United States Patent
Yasuda et al.

[11] Patent Number: 5,743,600
[45] Date of Patent: Apr. 28, 1998

[54] WHEEL BRAKING SYSTEM WITH A RETRACTING APPARATUS

[75] Inventors: Atsushi Yasuda, Aichi pref.; Toshihiro Nakano, Chiryu, both of Japan

[73] Assignee: Aisin Seiki Kabushiki Kaisha, Kariya, Japan

[21] Appl. No.: 703,813

[22] Filed: Aug. 27, 1996

Related U.S. Application Data

[63] Continuation of Ser. No. 515,028, Aug. 14, 1995, abandoned, which is a continuation of Ser. No. 295,050, Aug. 26, 1994, abandoned.

[30] Foreign Application Priority Data

Aug. 26, 1993 [JP] Japan ................................ 5-211824

[51] Int. Cl.⁶ ........................... B16D 65/18; B60T 8/40
[52] U.S. Cl. .............................. 303/116.1; 303/113.1; 303/116.2
[58] Field of Search ........................ 303/116.1, 113.2, 303/112, 11, 10, 115.2; 188/72.3, 72.4, 72.5, 72.6

[56] References Cited

U.S. PATENT DOCUMENTS

| | | | |
|---|---|---|---|
| 4,462,642 | 7/1984 | Leiber | 303/116.1 |
| 4,950,028 | 8/1990 | Harrison | 303/115.2 |
| 4,986,614 | 1/1991 | Ricker et al. | 303/115.2 |
| 5,150,951 | 9/1992 | Leiber et al. | 303/113.4 |

FOREIGN PATENT DOCUMENTS

| | | | |
|---|---|---|---|
| 4015882 | 11/1991 | Germany | 303/116.2 |
| 229334 | 2/1990 | Japan . | |
| 211629 | 3/1990 | Japan . | |
| 2218479 | 11/1989 | United Kingdom | 303/116.2 |

*Primary Examiner*—Matthew C. Graham
*Attorney, Agent, or Firm*—Sughrue, Mion, Zinn, Macpeak & Seas, PLLC

[57] ABSTRACT

The invention is directed to a wheel braking system having a master cylinder and a wheel brake cylinder which is communicated with the master cylinder through a brake fluid supply passage, and which is operatively mounted on a wheel for applying a braking force to the wheel. A suction device, such as a fluid pump, is provided for producing a negative pressure in the wheel brake cylinder. An initial pressure supply device, such as an accumulator, is also provided for supplying a predetermined amount of the brake fluid into the wheel brake cylinder when the braking operation is initiated. Accordingly, brake pads for braking the wheel may be separated from a brake rotor or brake drum respectively with a predetermined clearance, and the amount of the brake fluid which is consumed by the master cylinder when the braking operation is initiated, is not increased.

6 Claims, 3 Drawing Sheets

5,743,600

WHEEL BRAKING SYSTEM WITH A RETRACTING APPARATUS

This is a Continuation of application Ser. No. 08/515,028 filed Aug. 14, 1995, now abandoned which in turn is a continuation of 08/295,050 filed Aug. 26, 1994 and now abandoned.

BACKGROUND OF THE INVENTION

1. Field of the Invention

The present invention relates to a wheel braking system for a vehicle having a retracting apparatus, which provides a certain clearance between a brake rotor (or brake drum) and each brake pad provided at both sides of the brake rotor when the braking operation is released.

2. Description of the Prior Art

In a conventional wheel braking system, a brake rotor (or brake drum) rotating with a wheel is arranged to be gripped between two brake pads, which are provided in parallel with the brake rotor, and which restrains the brake rotor from rotating by a frictional force developed between the brake rotor (or brake drum) and each brake pad, when a piston which is slidably received in a caliper is forced to thrust. The braking system is sometimes provided with a known retracting mechanism which produces a certain clearance between the brake rotor (or brake drum) and each brake pad when the braking operation is released. With respect to the retracting mechanism, it is desirable to provide a clearance between the brake rotor and each brake pad enough to prevent a drag of the brake pad, which is the phenomenon of thrusting the brake pad against the rotating brake rotor (or brake drum), and which causes partial wear of the brake pad.

As an example of that braking system, a Japanese Utility-model Publication No. 2-11629 discloses a disc braking apparatus which includes a caliper having a cylinder, a piston slidably received in the cylinder, a pin for guiding the caliper, and a support for supporting the pin so as to be slidably received in the support. A circular recess is formed on the inner peripheral surface of the cylinder, and another circular recess is formed on the inner peripheral surface of the support. Circular elastic members are provided in the circular recesses respectively, under such conditions that the elastic members are pressed against the outer peripheral surface of the piston and the outer peripheral surface of the pin. When the elastic members are elastically deformed along their axes during the braking operation, a retroactive force is developed in each of the elastic members to return the piston and caliper which were moved to the direction for applying the braking force, to their initial positions respectively, and to produce a certain clearance between the brake rotor and each brake pad respectively. According to the braking apparatus proposed in the publication, each of the elastic members is particularly provided with an inner peripheral portion for pressing against the outer peripheral surface of the piston or the pin, and an outer peripheral portion which is connected to the inner peripheral portion with an offset toward one side wall of the recess away from the inner peripheral portion, and which has a parallel surface approximately parallel to the one side wall at the surface opposite to the one side wall. The outer peripheral portion is, therefore, forced to contact with the one side wall at its parallel surface, when the piston and caliper are moved to the direction for applying the braking force. Accordingly, when the piston and caliper are moved to the direction for applying the braking force, the inner peripheral portion is elastically deformed to close to the outer peripheral portion along its axis. In this case, a relatively large amount of elastic deformation is ensured to compensate a displacement enough to return each of the piston and caliper when the braking operation is released, whereby the clearance between the brake rotor and each brake pad may be made large enough.

However, according to the above-described prior wheel braking system, the clearance between the brake rotor and each brake pad is made large, so that the stroke of each brake pad is extended. It is, therefore, necessary to supply from the master cylinder the brake fluid enough to compensate the extended stroke of the brake pad. Consequently, the stroke of a manually operated braking member is so extended to deteriorate the brake feeling. The same problem as described above in connection with the disc brakes will be caused in connection with drum brakes employing brake drums.

SUMMARY OF THE INVENTION

Accordingly, it is an object of the present invention to provide a wheel braking system, wherein a clearance between a brake rotor (or brake drum) and each brake pad provided at both sides of the brake rotor can be enlarged without deteriorating a brake feeling.

It is another object of the present invention to provide a wheel braking system with a retracting apparatus and performing an anti-lock control for each wheel.

It is a further object of the present invention to improve the brake feeling at the time when the braking operation is initiated.

In accomplishing the above and other objects, a wheel braking system is provided with a master cylinder and a wheel brake cylinder which is communicated with the master cylinder through a brake fluid supply passage and which is operatively mounted on a wheel for applying a braking force to the wheel. A suction device is provided for producing a negative pressure in the wheel brake cylinder. And, an initial pressure supply device is provided for supplying a predetermined amount of brake fluid into the wheel brake cylinder when the braking operation is initiated.

According to the wheel brake system as described above, the negative pressure is produced in the wheel brake cylinder when the braking operation is initiated, so that brake pads for braking the wheel may be separated from a brake rotor (or brake drum) respectively with a predetermined clearance, in an embodiment of the wheel brake system. Provided that a predetermined amount of the brake fluid enough to contact the brake pad with the brake rotor (or brake drum) has been accumulated in the initial pressure supply device, the predetermined amount of the brake fluid may be supplied into the wheel brake cylinder by the initial pressure supply device, when the braking operation is initiated. Therefore, the amount of the brake fluid consumed by the master cylinder is not increased, even if the clearance between the brake rotor (or drum) and each brake pad is enlarged.

It is preferable that the above-described system further comprises a first valve which is provided for opening and closing the brake fluid supply passage, a brake fluid recirculation passage which is provided for recirculating the brake fluid from the wheel brake cylinder to the brake fluid supply passage at a position thereof between the master cylinder and the first valve, and a second valve which is provided for opening and closing the brake fluid recirculation passage. The suction device includes a fluid pump which is provided on the recirculation passage between the second valve and the master cylinder, so that the fluid pump discharges the brake fluid from the wheel brake cylinder. With the first and second valves provided on the brake fluid supply passage and recirculation passage, and with the fluid pump provided on the recirculation passage as described above, the hydraulic pressure in the wheel brake cylinder for a wheel which is being locked may be controlled to perform an anti-lock operation.

The above-described initial pressure supply device may include an accumulator which is communicated with the wheel brake cylinder for accumulating the brake fluid discharged from the wheel brake cylinder under a pressure to be varied in response to the accumulated amount of the brake fluid and supplying the brake fluid to the wheel brake cylinder when the braking operation is initiated, and a relief valve which is provided for allowing the brake fluid to flow from the accumulator to the master cylinder under a predetermined pressure less than the maximum pressure of the brake fluid accumulated in the accumulator. Thus, since the amount of the brake fluid accumulated in the accumulator can be varied in accordance with the predetermined pressure set for the relief valve, the clearance between the brake pad and the brake rotor (or brake drum) may be set as desired.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
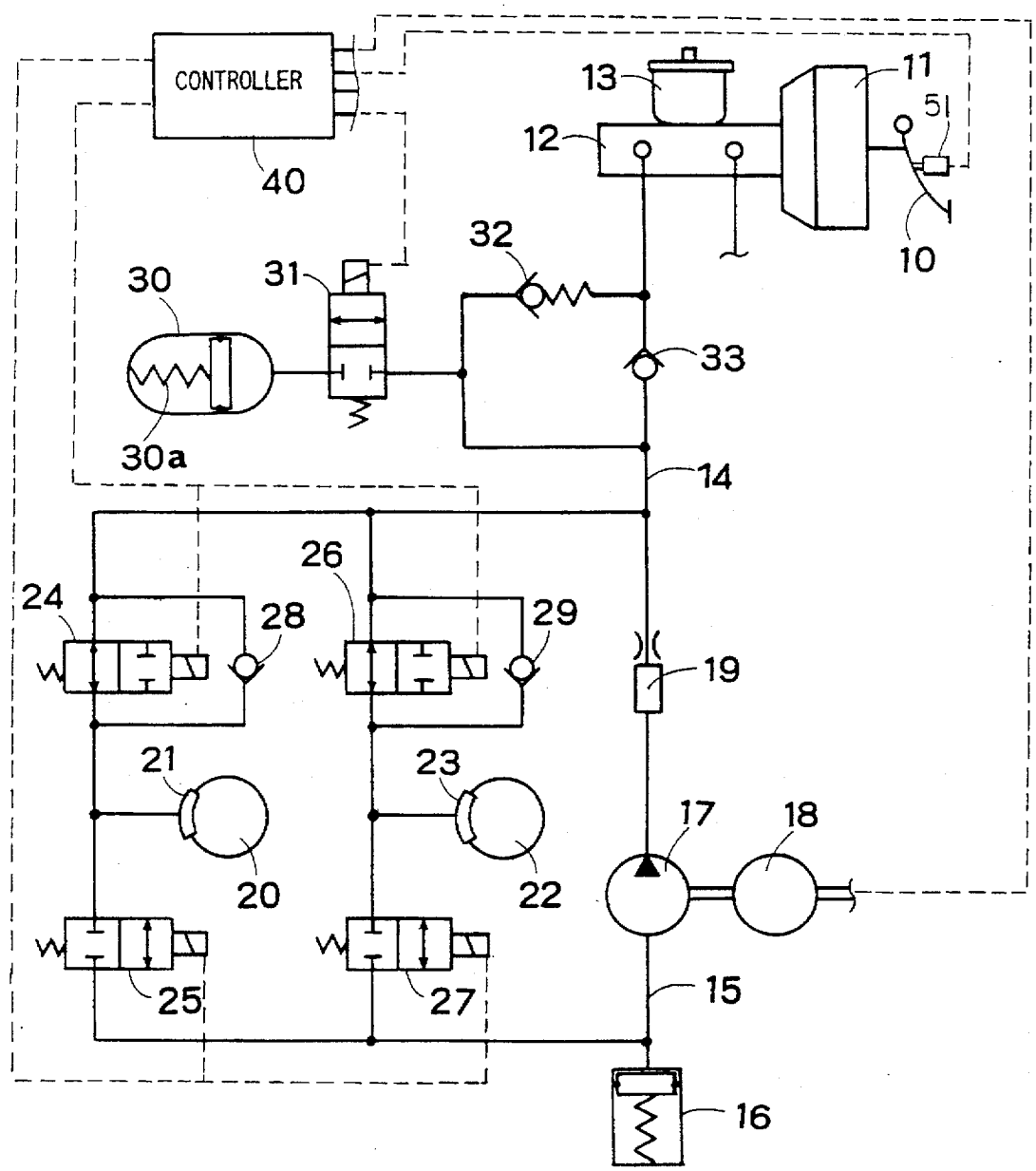
FIG. 1 is a schematic diagram of an embodiment of the present invention.

Referring to FIG. 1, there is illustrated an embodiment of the present invention, which is connected to a tandem master cylinder 12 provided with a reservoir tank 13. Wheel brakes 21, 23 are operatively mounted on wheels 20, 22 respectively to brake the wheels 20, 22. The master cylinder 12 is boosted by a brake booster 11, which is operated in response to depression of a brake pedal 10 which serves as a manually operated braking member.

First solenoid valves 24, 26 of a normally opened type are provided on a brake fluid supply passage 14 for communicating the master cylinder 12 with the wheel brakes 21, 23. One-way valves 28, 29 are provided in parallel with the first solenoid valves 24, 26 respectively to allow only the flow of brake fluid fed from the wheel brakes 21, 23 to the master cylinder 12. The one-way valves 28, 29 are disposed so as to bypass the first solenoid valves 24, 26 when the brake pedal 10 is released from its depressed condition, so that the brake fluid in the wheel brakes 21, 23 is immediately fed into the master cylinder 12, even if the first solenoid valves 24, 26 are placed in the closed positions. The wheel brakes 21, 23 are also communicated with a brake fluid recirculation passage 15, on which second solenoid valves 25, 27 of a normally closed type are provided. Further communicated with the recirculation passage 15 is a reservoir 16 for temporarily storing the brake fluid discharged from the wheel brakes 21, 23 through the second solenoid valves 25, 27. Between the reservoir 16 and the brake fluid supply passage 14, there are provided a fluid pump 17 driven by a motor 18, and a damper 19 for damping a pulsation of the hydraulic pressure discharged from the fluid pump 17.

At the upstream side of the positions of the brake fluid supply passage 14 where the first solenoid valves 24, 26 are provided, a one-way valve 33 is provided, and an accumulator 30 is disposed so as to communicate with the passage 14 at the downstream side of the one-way valve 33 through an initial hydraulic pressure supply solenoid valve 31 (hereinafter, referred to as initial pressure solenoid valve 31) of a normally closed type. The accumulator 30 is a device which stores a pressurized brake fluid, and supplies it as an initial brake fluid to the wheel brakes 21, 23 when the brake pedal 10 is depressed. It is so arranged that the brake fluid within the accumulator 30 is pressurized by a spring 30a provided therein in accordance with an amount of the accumulated or stored brake fluid in the accumulator 30. The accumulator 30 can be communicated with the passage 14 at the upstream side of the one-way valve 33 through the initial pressure solenoid valve 31 and a relief valve 32 which is opened with a smaller pressure applied than the maximum braking pressure produced by the spring 30a in the accumulator 30.

The first solenoid valves 24, 26 and the second solenoid valves 25, 27 are controlled by an electronic control device, or controller 40 to be energized or de-energized. The initial pressure solenoid valve 31 and the motor 18 are also controlled by the controller 40. Thus, the first solenoid valves 24, 26 are normally placed in their open positions, whereas they are closed when they are energized. The second solenoid valves 25, 27 are normally placed in their closed positions, whereas they are opened when they are energized. The initial pressure solenoid valve 31 is normally placed in its closed position, whereas it is opened when it is energized. The controller 40 includes a central processing unit, a read-only memory, a random access memory and etc. (not shown).

Figure 2:
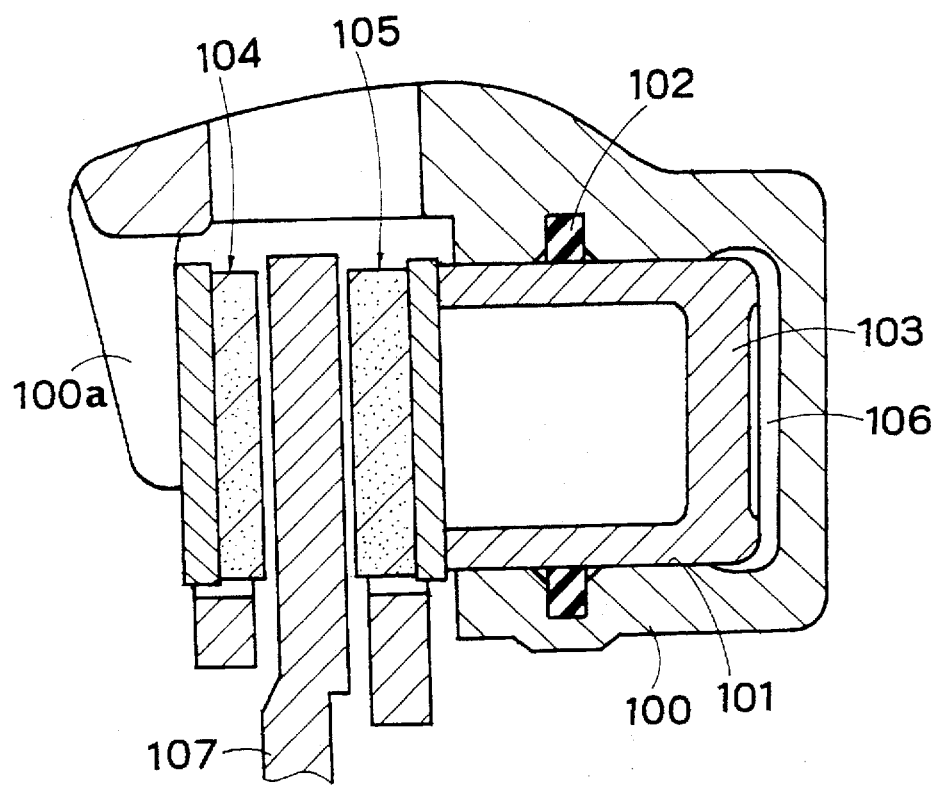
FIG. 2 is a sectional view of a caliper employed in the above embodiment.

FIG. 2 illustrates a disc brake system which is mounted on the wheel 20 or 22 and actuated by the wheel brakes 21 or 23. In this brake system, a caliper 100 is disposed around the periphery of a disc rotor, or brake rotor 107. The caliper 100 has a cylinder 101 defined therein and provided around its inner peripheral wall with a sealing ring 102. A piston 103 is slidably fitted into the cylinder 101. On the open end portion (the left side in FIG. 2) of the piston 103 and a pad holding arm 100a which is formed to be integral with the caliper 100, disc pads, or brake pads 104, 105 are supported respectively. Then, it is so arranged that the brake pads 104, 105 are pressed onto the brake rotor 107, when the hydraulic pressure is applied in a pressure chamber 106 which is defined between the head portion (the right side in FIG. 2) of the piston 103 and the bottom portion of the cylinder 101.

In operation, under a normal driving condition, the first solenoid valves 24, 26 are held to be opened, while the second solenoid valves 25, 27 and the initial pressure solenoid valve 31 are held to be closed. When the brake pedal 10 is depressed for braking the vehicle a switch 51 is actuated to supply a signal to the controller 40 which in turn sends a signal to the initial pressure solenoid valve 31 whereby the valve 31 is opened for a predetermined period of time which is set to the period of a certain time stored in one of the memories of the controller 40. During the initial pressure solenoid valve 31 is placed in its open position, the pressurized brake fluid which is accumulated in the accumulator 30, is supplied into the pressure chamber 106 of the wheel brakes 21, 23. Then, the hydraulic pressure in the pressure chamber 106 is raised to move the piston 103 toward the brake rotor 107 (leftwards in FIG. 2), and move the pad holding arm 100a toward the brake rotor 107 (rightwards in FIG. 2), so that the brake pads 104, 105 contact with the brake rotor 107. With the hydraulic pressure supplied from the master cylinder 12 into the pressure chamber 106, the brake pads 104, 105 are pressed onto the brake rotor 107 to stop the vehicle.

Figure 3:
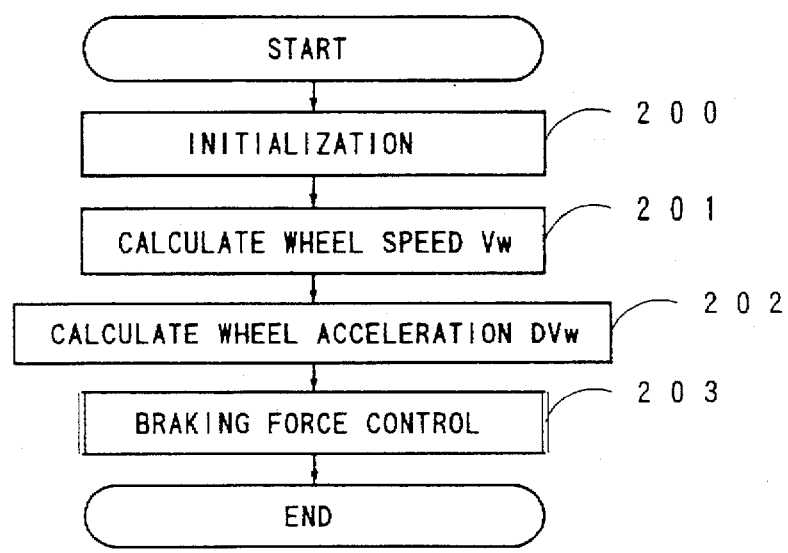
FIG. 3 is a flowchart of the braking operation in the above embodiment.
Figure 4:
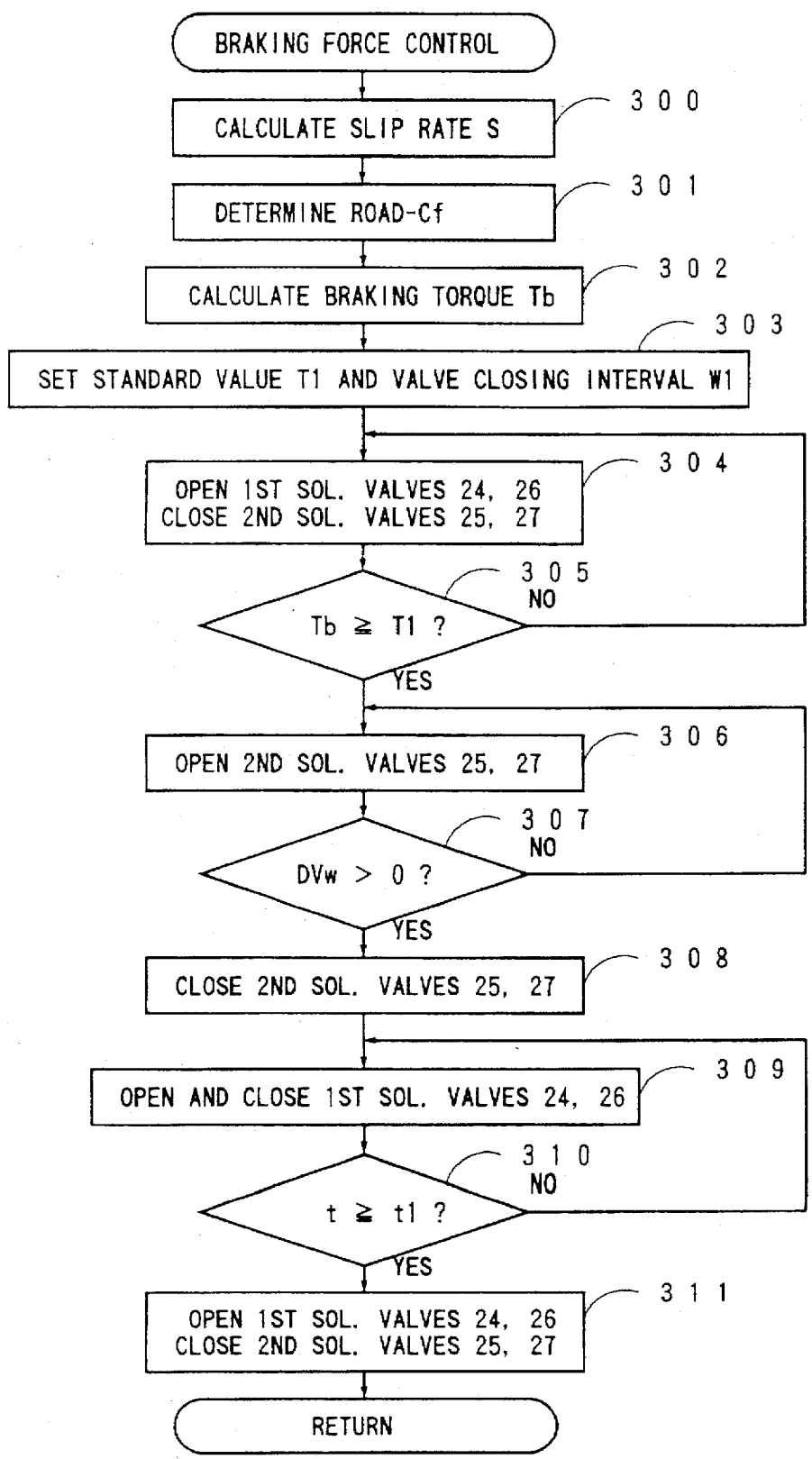
FIG. 4 is a flowchart of the braking force control in the above embodiment.

A program routine executed by the controller 40 for the anti-skid control will now be described with reference to FIGS. 3 and 4. FIG. 3 is a flowchart showing a main routine which is executed when the brake pedal 10 is depressed. The program routine in FIG. 3 starts at Step 200, wherein an initialization is executed to clear various data. Then, the program proceeds to Step 201, where a wheel speed Vw is calculated by multiplying the effective radius "Rw" and the angular velocity "w" of each wheel which is detected by each of the wheel speed sensors (not shown). And, a wheel acceleration DVw of each wheel is calculated by differentiating the wheel speed Vw at Step 202. In response to the calculated results, the solenoid valves 24–27 are energized or de-energized at Step 203, so that the hydraulic pressure applied to the wheel brakes 21, 23 is increased or decreased to thereby control the braking force applied to the wheels 20, 22.

The braking force control executed at Step 203 in FIG. 3 will be described further in detail referring to FIG. 4. At Step 300, the maximum value of the wheel speed Vw is calculated to provide a vehicle speed Vs, from which a slip rate S is calculated as follows:

$$S=(Vs-Vw)/Vs$$

Then, at Step 301, a coefficient of friction Cf of a road surface on which the vehicle is running, is obtained from Cf=f(S), as a function of the slip rate S to determine a condition of the road surface. According to the present embodiment, the condition of the road surface is selected from a road surface of a high coefficient of friction (high-Cf), that of an intermediate coefficient of friction (intermediate-Cf) and that of a low coefficient of friction (low-Cf).

Then, the program proceeds to Step 302, where a braking torque Tb is calculated as follows:

$$Tb=-(Cf \times Rw \times Mv \times G + Mi \times (w_i - w_{i-1})/dt)$$

where "Rw" is the radius of the wheel, "Mv" is a mass of the vehicle, "G" is a gravitational acceleration, "Mi" is an inertia moment of the wheel, "w" is the angular velocity of the wheel, wherein "$w_i$" indicates its value obtained at the time of the calculation, while "$w_{i-1}$" indicates its value obtained at the time prior to the calculation by a time "dt", and "x" represents multiplication. Furthermore, a standard value T1 and valve closing interval W1 are provided at Step 303, in accordance with a braking condition which is determined on the basis of the wheel speed Vw, the wheel acceleration DVw and the vehicle speed Vs, and the road surface coefficient of friction Cf which is determined at Step 301.

Next, the program proceeds to Step 304 where the first solenoid valves 24, 26 are held to be opened and the second solenoid valves 25, 27 are held to be closed, so that the hydraulic braking pressure in the wheel brakes 21, 23 (hereinafter, simply referred to as wheel braking pressure) is held at a certain value of high pressure. Then, the braking torque Tb is compared with the standard value T1 at Step 305. If it is determined that the braking torque Tb is less than the standard value T1, the program returns to Step 304 where the wheel braking pressure is held as it is. If it is determined, at Step 305, that the braking torque Tb is equal to, or more than the standard value T1, the program proceeds to step 306 where the second solenoid valves 25, 27 are opened, so that the wheel brakes 21, 23 are communicated with the reservoir 16 to reduce the wheel braking pressure.

As a result, if the wheel acceleration DVw becomes positive(+), the program proceeds to Step 308 where the second solenoid valves 25, 27 are closed. Then, at Step 309, the first solenoid valves 24, 26 are intermittently opened and closed to provide so-called pulse increase mode (or step increase mode) wherein an increase mode and a hold mode are alternately repeated to increase the wheel braking pressure gradually. This pulse increase mode is continuously performed for a predetermined time t1. If it is determined, at Step 310, that more than the predetermined time t1 has been elapsed, the program proceeds to Step 311 where the first solenoid valves 24, 26 are opened, while the second solenoid valves 25, 27 are held to be in their closed positions, so that the wheel braking pressure is held, and then the program returns to the main routine in FIG. 3. In this embodiment, the wheel braking pressure for the wheels 20, 22 are controlled simultaneously, whereas each of the wheels 20, 22 may be controlled separately. The predetermined time t1 as described above is set to a value which meets such conditions as follows: That is, provided that "Mh" represents an increasing pressure amount of the wheel braking pressure for the wheel which is being locked when the vehicle is running on the high-Cf road surface, "Vph" represents an increasing rate of the pressure at that time, and "Vpa" represents an average increasing rate of the pressure at that time, the time "t1" is set to a value between (Mh/Vph) and (Mh/Vpa), i.e., t1 is more than (Mh/Vph) and less than (Mh/Vpa).

Next will be explained the operation performed at the time when the braking operation is released. When the brake pedal 10 is released, the initial pressure solenoid valve 31 is opened, so that the brake fluid in the pressure chamber 106 of the wheel brakes 21, 23 is introduced into the accumulator 30 through the first solenoid valves 24, 26 and the initial pressure solenoid valve 31. When the amount of the brake fluid which is introduced into the accumulator 30 is increased, a reaction force is caused to be increased. If the increased reaction force prevails a reaction force of the relief valve 32, the relief valve 32 is opened to return the brake fluid to the master cylinder 12 through the relief valve 32. Thereafter, the initial pressure solenoid valve 31 is closed when the predetermined time period which has been stored in the memory of the controller 40 is elapsed.

When a predetermined time period, e.g. 30 seconds period which has been stored in the memory of the controller 40, is elapsed after the brake pedal 10 was released, the first solenoid valves 24, 26 are closed, the second solenoid valves 25, 27 are opened, and the motor 18 is actuated, then the brake fluid in the recirculation passage 15 is recirculated into the pressure introducing passage 14 by the fluid pump 17. Consequently, the pressure in the pressure chamber 106 of the wheel brakes 21, 23 is turned to be negative, so that the piston 103 as shown in FIG. 2 is moved away from the brake rotor 107 (rightwards in FIG. 2), while the pad holding arm 100a of the caliper 100 is moved away from the brake rotor 107 (leftwards in FIG. 2). Therefore, a certain clearance is made between the brake rotor 107 and each of the brake pads 104, 105, respectively.

Even if the clearance is made large between the brake rotor 107 and each of the brake pads 104, 105, the brake fluid enough to contact the brake pads 104, 105 with the brake rotor 107 can be supplied according to the present embodiment, because the predetermined amount of the brake fluid has been accumulated in the accumulator 30 after the brake pedal 10 was released. Therefore, no increase of the brake fluid discharged from the master cylinder 12 is required, so that the feeling in the braking operation is not deteriorated, nor the pad-drag is caused. Since the amount of the brake fluid consumed in the master cylinder 12 can be controlled by setting the amount of the brake fluid accumulated in the accumulator 30 to a desired amount, the brake feeling can be set as desired.

According to the present embodiment, the amount of the brake fluid accumulated in the accumulator 30 is determined in accordance with a difference of reaction force between the accumulator 30 and the relief valve 32. However, it may be determined by setting a certain time period for opening the initial pressure solenoid valve 31. It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A wheel braking system having a brake pedal operatively connected to a master cylinder and a wheel brake cylinder communicated with said master cylinder through a brake fluid supply passage and operatively mounted on a wheel whereby upon operating said master cylinder by depressing said brake pedal a braking operation is initiated for applying a braking force to said wheel comprising:

control means for controlling an anti-skid control operation;

switch means adapted to be switched from a first position to a second position upon depression of said brake petal and connected to said control means;.

suction means connected to said control means for producing a negative pressure in said wheel brake cylinder upon switching of said switch means to the first position upon termination of the braking operation to move a piston in the brake cylinder away from a brake member; and initial pressure supply means operably connected to said control means for supplying a predetermined amount of brake fluid into said wheel brake cylinder when the braking operation is initiated and said switch means is switched to said second position.

2. A wheel braking system as claimed in claim 1, further comprising:

first valve means for opening and closing said brake fluid supply passage;

a brake fluid recirculation passage for recirculating the brake fluid from said wheel brake cylinder to said brake fluid supply passage at a position thereof between said master cylinder and said first valve means; and second valve means for opening and closing said brake fluid recirculation passage;

said suction means including a fluid pump provided on said recirculation passage between said second valve means and said master cylinder, said fluid pump discharging the brake fluid from said wheel brake cylinder.

3. A wheel braking system as claimed in claim 2, further comprising a reservoir provided on said brake fluid recirculation passage between said second valve means and said pump for storing the brake fluid discharged from said wheel brake cylinder through said second valve means.

4. A wheel braking system as claimed in claim 1, said initial pressure supply means including:

an accumulator communicated with said wheel brake cylinder for accumulating the brake fluid discharged from said wheel brake cylinder under a pressure varied in response to the accumulated amount of the brake fluid and supplying the brake fluid to said wheel brake cylinder when the braking operation is initiated;

third valve means for opening and closing an auxiliary passage communicated with said accumulator for supplying the brake fluid to said wheel brake cylinder and returning the brake fluid to said master cylinder, said third valve means normally closing said auxiliary passage and opening said auxiliary passage when the braking operation is initiated;

a relief valve in said auxiliary passage for allowing the brake fluid to flow from said accumulator to said master cylinder under a predetermined pressure less than the maximum pressure of the brake fluid accumulated in said accumulator; and a one-way valve provided on said brake fluid supply passage for allowing the brake fluid to flow from said master cylinder to said wheel brake cylinder and preventing the counterflow, said relief valve communicated with said master cylinder upstream of said one-way valve, and said third valve means communicated with said wheel brake cylinder downstream of said one-way valve.

5. A wheel braking system as claimed in claim 4, wherein said accumulator includes a housing for defining a variable volume chamber and a spring for biasing said chamber to reduce the volume thereof, and wherein the brake fluid is supplied from said wheel brake cylinder to said chamber against the biasing force of said spring to produce the brake fluid pressurized at the pressure varied in response to the accumulated amount of the brake fluid.

6. A wheel braking system having a master cylinder, wheel brake cylinders operatively mounted on wheels, a main passage for communicating said master cylinder with said wheel brake cylinders, pressure increase valves disposed in said main passage between said master cylinder and said wheel brake cylinders, a recirculation passage for communicating said wheel brake cylinders with said main passage between said master cylinder and said pressure increase valves, and a fluid pump disposed in said recirculation passage, comprising:

a pressure source communicated with said main passage between said master cylinder and said pressure increase valves;

a cut-off valve disposed between said pressure source and said main passage;

a check valve disposed in said main passage between said master cylinder and a position connected with said pressure source, said check valve allowing the brake fluid to flow from said master cylinder to said pressure increase valves, and preventing the brake fluid from flowing from said pressure increase valves to said master cylinder;

detection means for detecting a braking operation; and brake control means for closing said pressure increase valves and driving said fluid pump to pump brake fluid from said wheel brake cylinders to generate a negative pressure in said wheel brake cylinders to move a piston in the brake cylinder away from a brake member when said detection means detects a release from the braking operation, said brake control means opening said pressure increase valves and opening said cut-off valve to supply the brake fluid into said wheel brake cylinders when said detection means detects initiation of a braking operation.

* * * * *